(12) United States Patent
Mehta et al.

(10) Patent No.: US 10,861,011 B2
(45) Date of Patent: Dec. 8, 2020

(54) METHOD AND SYSTEM OF AUTHENTICATION OF ELECTRONIC PAYMENTS

(71) Applicants: Shashank Mehta, Bangalore (IN); Harshil Mathur, Bangalore (IN)

(72) Inventors: Shashank Mehta, Bangalore (IN); Harshil Mathur, Bangalore (IN)

( * ) Notice: Subject to any disclaimer, the term of this patent is extended or adjusted under 35 U.S.C. 154(b) by 721 days.

(21) Appl. No.: 15/175,021

(22) Filed: Jun. 6, 2016

(65) Prior Publication Data
US 2017/0286954 A1 Oct. 5, 2017

(51) Int. Cl.
*G06Q 20/40* (2012.01)
*G06Q 20/38* (2012.01)

(52) U.S. Cl.
CPC ......... *G06Q 20/40* (2013.01); *G06Q 20/3821* (2013.01)

(58) Field of Classification Search
CPC ....................................................... G06Q 20/40
(Continued)

(56) References Cited

U.S. PATENT DOCUMENTS

2010/0114740 A1* 5/2010 Dominguez ........... G06Q 20/40
705/26.1
2014/0279516 A1* 9/2014 Rellas ................ G06Q 30/0185
705/44

(Continued)

OTHER PUBLICATIONS

A. Al-Qayedi, W. Adi, A. Zahro and A. Mabrouk, "Combined Web/mobile authentication for secure Web access control," 2004 IEEE Wireless Communications and Networking Conference (IEEE Cat. No. 04TH8733), Atlanta, GA, USA, 2004, pp. 677-681 vol. 2, doi: 10.1109/WCNC.2004.1311267. (Year: 2004).*

Primary Examiner — Jessica Lemieux (57) ABSTRACT

In one aspect, a computerized system for authentication of an electronic payment on a computing device, the system includes a computer memory in the computing device a payment page. The payment page includes at least one element, from the financial institution in response to the initiation. Each of the at least one element corresponds to a mode of authentication of an electronic payment. The payment page is received by the computing device from a remote server. A computer processor in the computing device, which computer processor is coupled to the computer store and programmed to detect an initiation of the electronic payment on the computing device, the electronic payment comprising payment from an account at a financial institution. The computer processor is programmed to obtain the payment page from the computer memory. The computer processor is programmed to identify a presence of a first element corresponding to a first mode of authentication on the payment page, wherein the first mode of authentication comprises receiving a first credential in the computing device after the initiation. The computer processor is programmed to receive a selection of the first mode of authentication. The computer processor is programmed to scan a set of incoming messages in the computing device for the first credential. The computer processor is programmed to extract the first credential from a message comprising the first credential. The computer processor is programmed to enter the first credential into a second interface optimized for a display of the computing device that is displayed in response to the selection of the first item. The computer processor is programmed to communicate the first credential to the payment page, for authentication of the electronic payment.

16 Claims, 7 Drawing Sheets

(58) Field of Classification Search
USPC .......................................................... 705/44
See application file for complete search history.

(56) References Cited

U.S. PATENT DOCUMENTS

2015/0032578 A1* 1/2015 Bicer ..................... H04L 63/08
  705/26.82
2015/0363380 A1* 12/2015 McNaught ............ G06F 17/248
  715/235

* cited by examiner

METHOD AND SYSTEM OF AUTHENTICATION OF ELECTRONIC PAYMENTS

CROSS-REFERENCE TO RELATED APPLICATIONS

This application is a claims priority from Indian Patent Application No. 4484/CHE/2015, title AUTHENTICATION OF ELECTRONIC PAYMENTS and filed Mar. 31, 2016. This application is hereby incorporated by reference in its entirety.

FIELD OF THE INVENTION

This application relates generally to electronic payments, and more specifically to a system, article of manufacture and method of authentication of electronic payments.

DESCRIPTION OF THE RELATED ART

Electronic payments are gaining widespread acceptance among users owing to their simplicity and widespread use of Internet by the users, which enables the users to make payments from anywhere and at any time. An electronic payment may be performed for performing a variety of transactions, which may include, but are not restricted to, purchasing items from an e-commerce portal. To perform the electronic payment, usually, a user enters one or more credentials on a payment page displayed on a web browser. The one or more credentials are provided to the user by a financial institution, such as a bank, in which the user holds an account. The payment page is provided by the financial institution. The one or more credentials may include, but are not restricted to, a user ID, a password, and details of a payment card, which are associated with the account. The electronic payment is completed by the financial institution based on authentication of the one or more credentials.

BRIEF SUMMARY OF THE INVENTION

In one aspect, a computerized system for authentication of an electronic payment on a computing device, the system includes a computer memory in the computing device a payment page. The payment page includes at least one element, from the financial institution in response to the initiation. Each of the at least one element corresponds to a mode of authentication of an electronic payment. The payment page is received by the computing device from a remote server. A computer processor in the computing device, which computer processor is coupled to the computer store and programmed to detect an initiation of the electronic payment on the computing device, the electronic payment comprising payment from an account at a financial institution. The computer processor is programmed to obtain the payment page from the computer memory. The computer processor is programmed to identify a presence of a first element corresponding to a first mode of authentication on the payment page, wherein the first mode of authentication comprises receiving a first credential in the computing device after the initiation. The computer processor is programmed to receive a selection of the first mode of authentication. The computer processor is programmed to scan a set of incoming messages in the computing device for the first credential. The computer processor is programmed to extract the first credential from a message comprising the first credential. The computer processor is programmed to enter the first credential into a second interface optimized for a display of the computing device that is displayed in response to the selection of the first item. The computer processor is programmed to communicate the first credential to the payment page, for authentication of the electronic payment.

BRIEF DESCRIPTION OF THE DRAWINGS

The Figures described above are a representative set, and are not exhaustive with respect to embodying the invention.

DESCRIPTION

Disclosed are a system, method, and article of manufacture for authentication of electronic payments. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Example definitions for some embodiments are now provided.

Electronic payment can be payment system used to settle financial transactions through the transfer of monetary value, and includes the institutions, instruments, people, rules, procedures, standards, and technologies that make such an exchange possible. Example electronic payments can include e-commerce payments, electronic bill payments, etc.

Javascript id a high-level, dynamic and interpreted programming language. It has been standardized in the ECMAScript language specification. It is noted that other similar programming languages can be used in other example embodiments.

One-time password (OTP) can be a password that is valid for only one login session or transaction, on a computer system or other digital device.

Additional example definitions are provided herein.

Example Methods and Systems

Electronic payments are performed by users to complete a variety of transactions. The various transactions may include, but are not restricted to, purchasing an item from an e-commerce portal and booking a ticket for a journey. In some embodiments, to perform an electronic payment, a user selects a 'pay' option, for example, after selecting the item in the e-commerce portal. Thereafter, a payment page is displayed, in which a user enters one or more credentials. The one or more credentials may be provided by a financial institution, such as a bank, in which the user holds an account. The one or more credentials may include, but are not restricted to, details of a payment card provided to the user by the financial institution and a password.

It is noted that in some examples, the displayed payment page is difficult for viewing on a computing device on which the electronic payment is performed, as the items on the payment page are not clearly visible. The difficulty in viewing is increased in computing devices, such as a mobile phone, which have a small sized display. The items on the payment page may include, but are not restricted to, a menu for selecting a mode of payment, a menu for selecting a mode of authentication, and a field for entering a credential. The mode of payment includes, but is not restricted to, a payment card mode and an Internet banking mode. The mode of authentication may be, for example, a one-time password (OTP) authentication and a full-time password (FTP) authentication.

When the mode of authentication is OTP authentication, a password is communicated to the user by the financial institution for completing the electronic payment. The OTP is communicated to a computing device associated to the user, which may also be the computing device on which the electronic payment is performed. When the computing device on which the electronic payment is performed is same as the computing device to which the OTP is communicated, the user has to invest significant amount of time and effort to enter the OTP on the payment page. For example, the user has to navigate from the payment page to an application on which the OTP is received, determine a message in the application which contains the OTP, identify the OTP from the message, memorize the OTP or copy the OTP from the message, navigate back to the payment page, and finally, enter it on the payment page.

The present subject matter describes methods and systems for authenticating electronic payments. With the methods and systems of the present subject matter, effort involved in authenticating electronic payments is significantly reduced.

In one embodiment, systems and methods for enabling authentication of electronic payments in a computing are provided. For this, initiation of an electronic payment is detected. The electronic payment involves payment from an account at a financial institution. In response to the initiation of the electronic payment, a payment page is received from the financial institution. The payment page includes at least one element. Each of the at least one element corresponds to a mode of authentication. The presence of a first element, which corresponds to a first mode of authentication, in the payment page is identified. The first mode of authentication includes receiving a first credential in the computing device after the initiation of the electronic payment. Thereafter, a selection of the first mode of authentication is received.

Further, in an implementation of the present subject matter, in response to the selection of the first mode of authentication, scan of incoming messages on the computing device is performed for the first credential. The first credential is then extracted from a message including it and entered into a second interface. The second interface is also optimized for to the size of the display and is displayed in response to the selection of the first item. The first credential can then be communicated to the payment page for authentication of the electronic payment.

Since the interface is optimized to the size of the display of the computing device, the difficulty associated with viewing content in the payment page is significantly reduced. Further, since a scan for the credential is automatically performed and the credential is automatically entered into the interface, manual intervention involved in authenticating the electronic payment is considerably decreased.

These and other advantages of the present subject matter would be described in greater detail in conjunction with the following figures. It should be noted that the description and figures merely illustrate the principles of the present subject matter.

Figure 1:
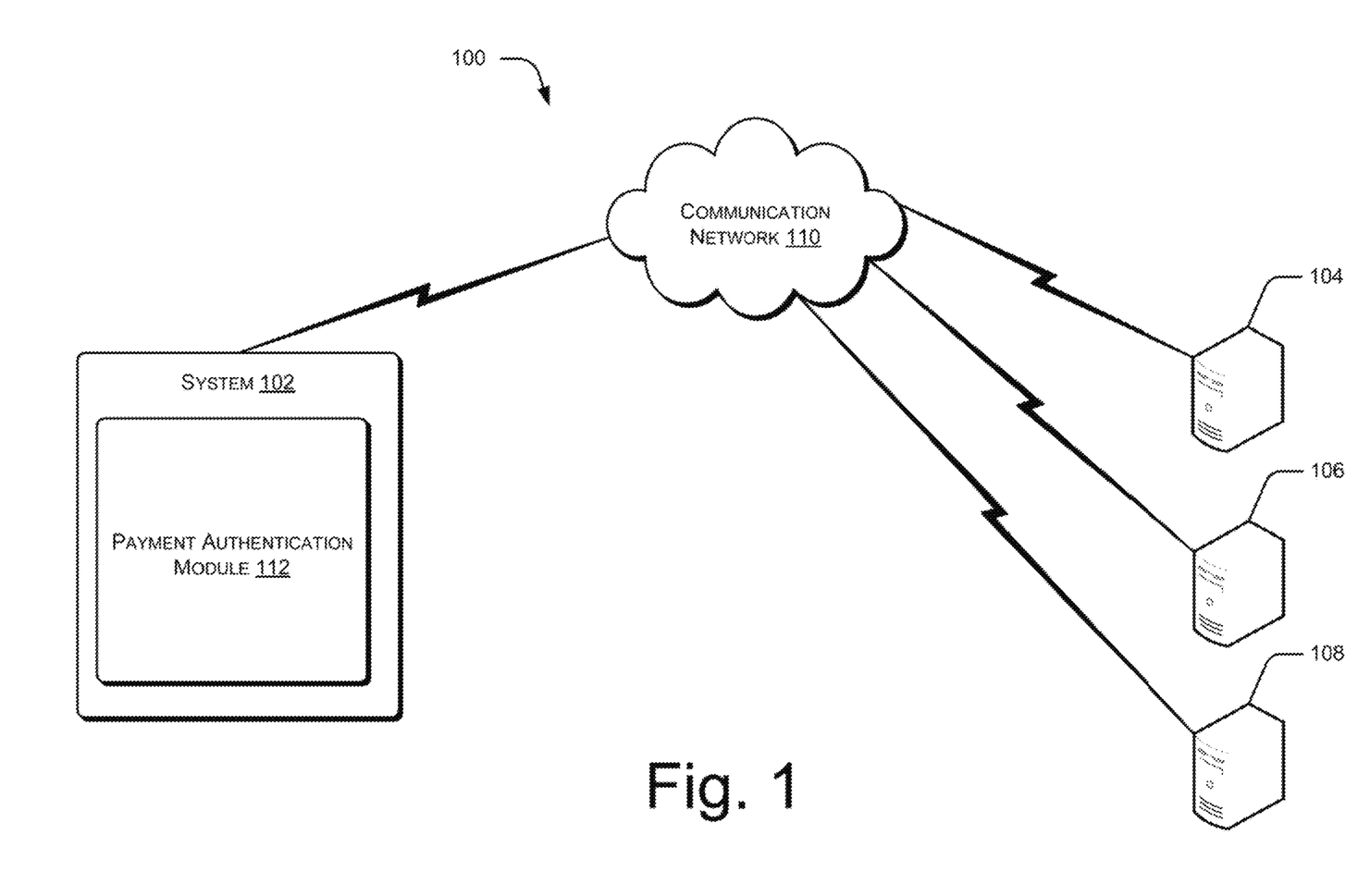
FIG. 1 illustrates a schematic representation of a network environment implementing a system, in accordance with an implementation of the present subject matter.

FIG. 1 illustrates a schematic representation of a network environment 100 implementing a system 102, in accordance with an implementation of the present subject matter. The network environment 100 may either be a public distributed environment or may be a private closed network environment. The network environment 100 includes the system 102 communicatively coupled to a first server 104, a second server 106, and a third server 108 through a communication network 110. The system 102 may be also referred to as computing device 102. The first server 104 may be a database server on an application server employed by the financial institution to communicate with the system 102 for the electronic payment. The second server 106 may be a database server or an application server of a merchant with whom the user performs a transaction, such as purchasing goods, for which the user makes the electronic payment. The merchant may be, for example, an e-commerce portal. The third server 108 may be a database server or an application server that may mediate communication between the first server 104 and the system 102.

The system 102 may be implemented as any computing system, which may be, but is not restricted to, a server, a workstation, a desktop computer, a laptop, a smartphone, a personal digital assistant (PDA), a tablet, a virtual host, and an application. The system 102 may also be a machine-readable instructions-based implementation or a hardware-based implementation, or a combination thereof.

The communication network 108 may be a wireless or a wired network, or a combination thereof. The communication network 108 may be a collection of individual networks, interconnected with each other and functioning as a single large network (e.g., the internet or an intranet). Examples of such individual networks include, but are not restricted to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network 108 includes various network entities, such as transceivers, gateways, and routers; however, such details have been omitted for ease of understanding.

In an implementation of the present subject matter, the system 102 includes a payment authentication module 112. The functions of the payment authentication module 112 are explained in detail with reference to FIG. 4.

Figure 2:
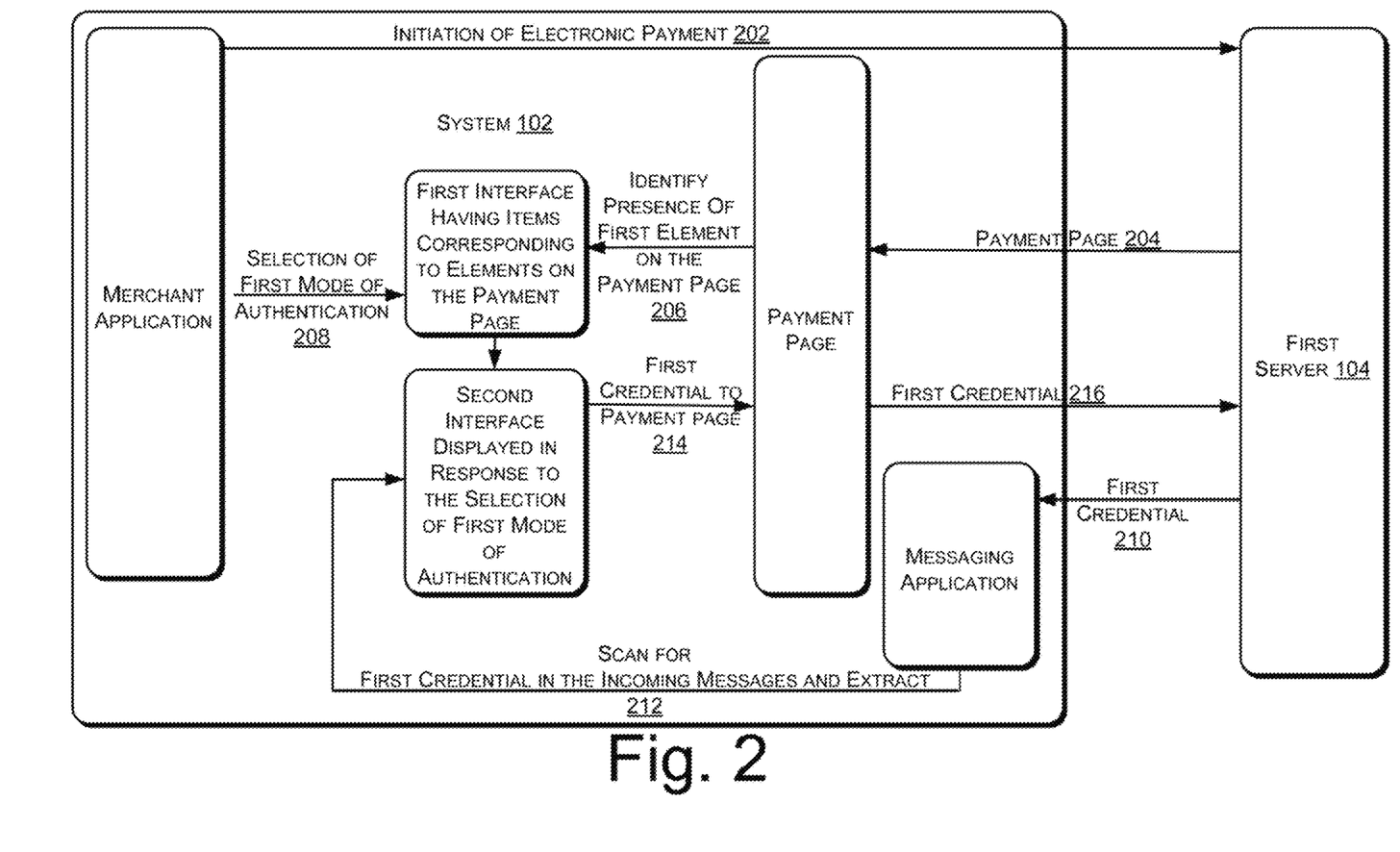
FIG. 2 illustrates a sequence of operations for authentication of electronic payment, in accordance with an implementation of the present subject matter.

FIG. 2 illustrates a sequence of operations for authentication of the electronic payment, in accordance with an implementation of the present subject matter. At step 202, an initiation of an electronic payment is detected. The electronic payment involves payment from an account at a financial institution. The account at the financial institution may be an account held by a user performing the electronic payment at the financial institution. The initiation of the electronic payment can be detected when, for example, the user selects a 'pay' option in a merchant application after entry of details of the user's payment card. The merchant application may include, but is not restricted to, an e-commerce application and a ticket booking application. The payment card may be a credit card or a debit card associated with the account.

In response to the initiation of the electronic payment, at step 204, a payment page is sent by the financial institution. The payment page may be sent by the first server 104 of the financial institution. The payment page can be received in the merchant application. The payment page includes at least one element, which corresponds to a mode of authentication for the electronic payment. The mode of authentication refers to a type of credential through which the user would like to be authenticated for the electronic payment. The mode of authentication can include, but is not restricted to, a first mode of authentication and a second mode of authentication. Correspondingly, the type of credential can be a first credential and a second credential. The first credential, commonly referred to as OTP, is a credential that is received at a computing device associated with the user after initiation of the electronic payment. The computing device associated with the user may be the system 102. The first credential may be received at the computing device associated with the user through a message. The message can be, but is not restricted to, a Short Messaging Service (SMS) message, an email, and a message generated by an application of the financial institution in the computing device. The second credential is a password provided to the user by the financial institution before initiation of the electronic payment. The second credential may be, but is not restricted to, a password associated with Internet banking and a 3D secure PIN.

At step 206, the presence of a first element corresponding to the first mode of authentication is identified on the payment page. Based on the identification, a first interface, to be displayed on the display of the system 102, is generated. The first interface is optimized to a size of display of the system 102 and includes a first item for selection of the first mode of authentication. The first item can be, for example, a menu with text "Use OTP for authentication". At step 208, a selection of the first item is received on the first interface. Although receiving selection of the first mode of authentication is shown to include receiving selection of the first item on the first interface, however, the selection can be received from a stored user preference of the first mode of authentication. The receipt of the selection from the stored user preference is illustrated in greater detail with respect to description of FIG. 4.

In response to the selection, a second interface, also optimized to the size of the display of the system 102, is generated for display. Further, in response to the selection, at step 210, the first credential is communicated to a messaging application in the system 102. The messaging application can include, but is not restricted to, an SMS application and an email application.

At step 212, a scan is performed for the first credential and the first credential is extracted from a message in the messaging application that includes it. The first credential is then entered into the second interface. At step 214, the first credential is communicated to the payment page for authentication of the electronic payment. The first credential can then be sent to the first server to complete the authentication of the electronic payment, as shown in step 216.

Figure 3:
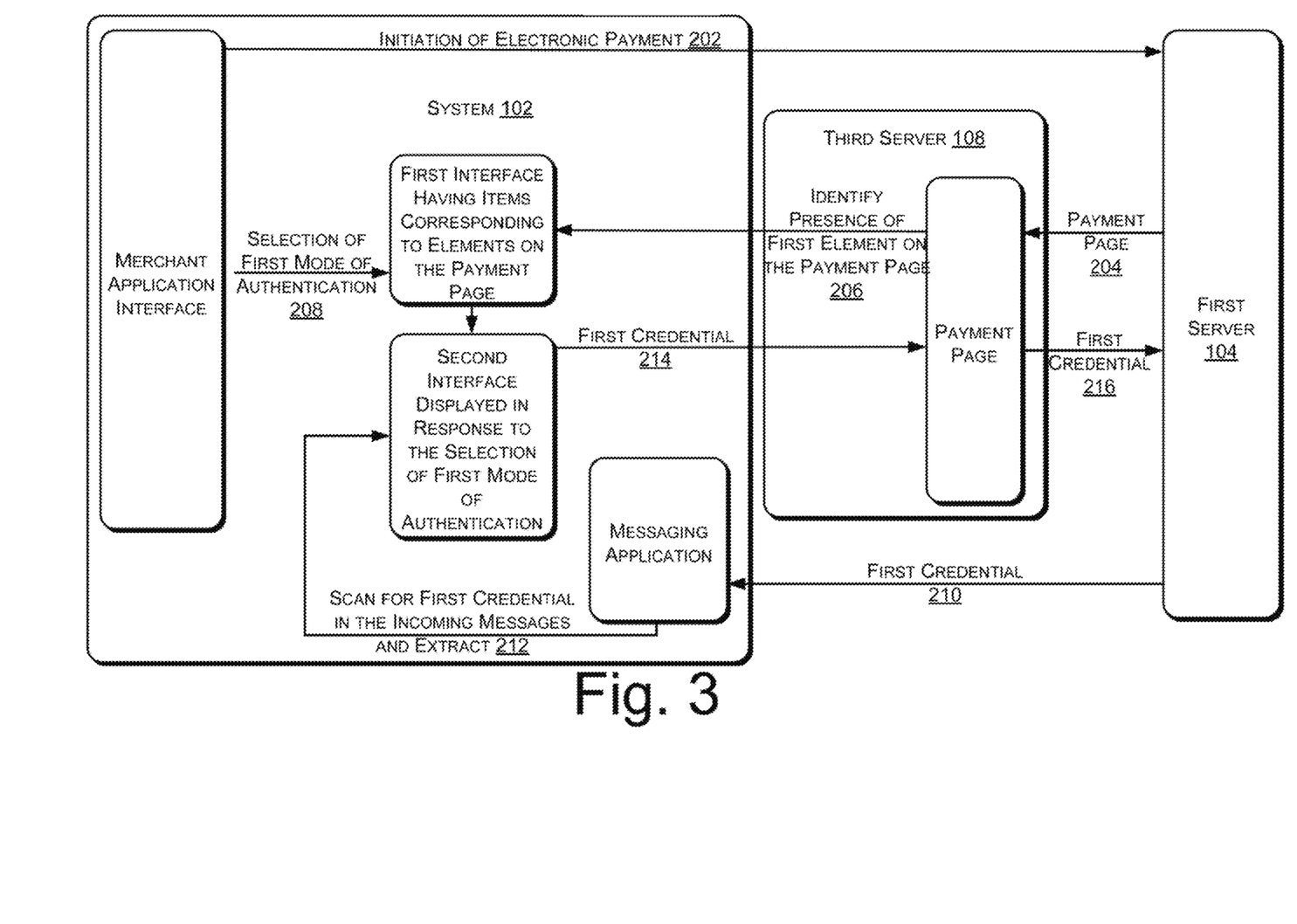
FIG. 3 illustrates a sequence of operations for authentication of electronic payment, in accordance with an implementation of the present subject matter.

FIG. 3 illustrates a sequence of operations for authentication of the electronic payment, in accordance with an implementation of the present subject matter. Here, the step 206, i.e., identification of the first element on the payment page, is performed in the third server 108. Thus, the payment page is not communicated to the system 102. This minimizes data to be downloaded in the system 102 for the electronic payment.

Figure 4:
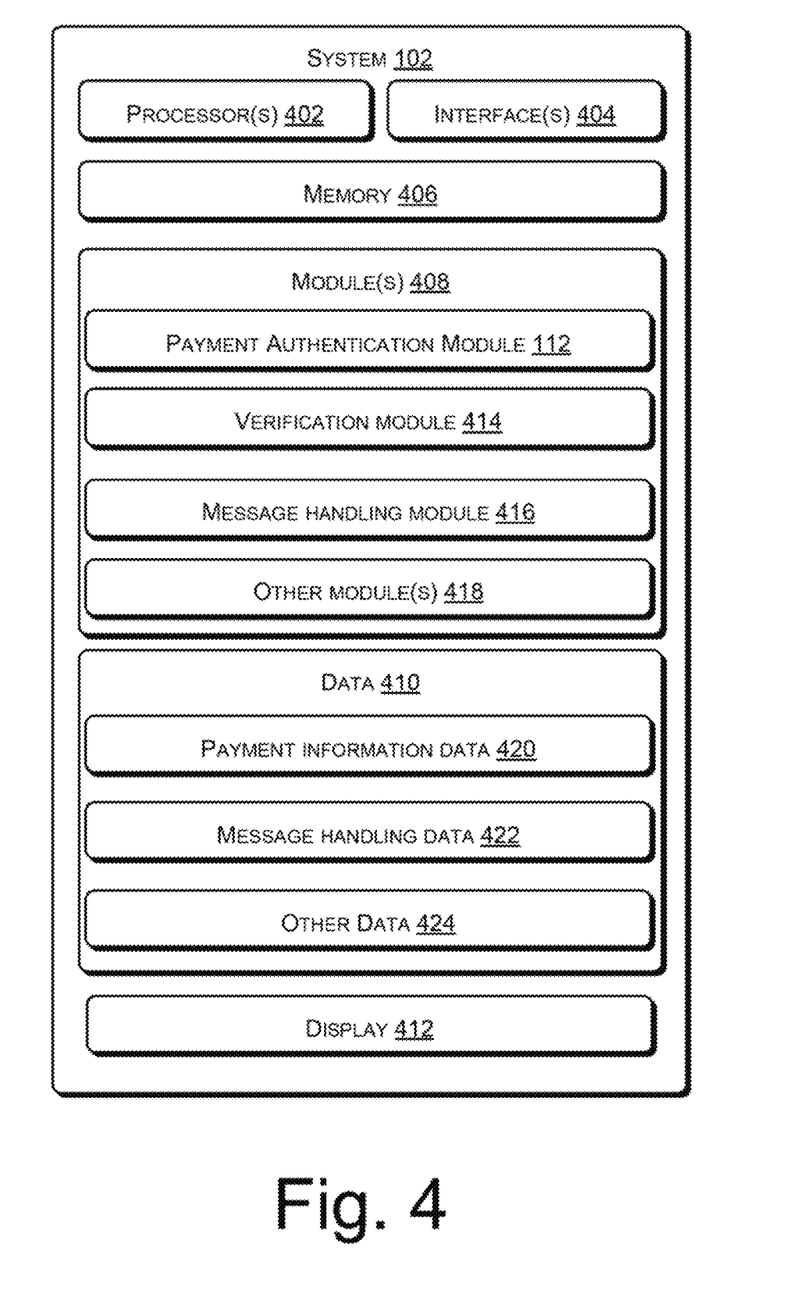
FIG. 4 illustrates components of the system, in accordance with an implementation of the present subject matter.

FIG. 4 illustrates components of the system 102, in accordance with an implementation of the present subject matter. The system 102 can include a processor(s) 402 to run at least one operating system and other applications and services. The system can also include an interface(s) 404 and a memory 406. Further, the system 102 can include module(s) 408 and data 410. In addition, the system can include a display 412.

The processor(s) 402, amongst other capabilities, may be configured to fetch and execute computer-readable instructions stored in the memory 406. The processor(s) 402 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labeled as "processor(s)", may be provided through the use of dedicated hardware as well as hardware capable of executing machine readable instructions.

When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The interface(s) 404 may include a variety of machine-readable instructions-based interfaces and hardware interfaces that allow the system 102 to interact with different entities, such as the processor(s) 402, the module 408, and the data 410. Further, the interface(s) 404 may enable the components of the system 102 to communicate with communication and computing devices, web servers, and external repositories. The interface(s) 404 may facilitate multiple communications within a wide variety of networks and protocol types, including wireless networks, wireless Local Area Network (WLAN), RAN, satellite-based network, etc.

The memory 406 may be coupled to the processor(s) 402 and may, among other capabilities, provide data and instructions for generating different requests. The memory 406 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The module(s) 408 may include routines, programs, objects, components, data structures, and the like, which perform particular tasks or implement particular abstract data types. The module(s) 408 may further include modules that supplement applications on the system 102, for example, modules of an operating system. Further, the module(s) 408 may be implemented in hardware, instructions executed by a processing unit, or by a combination thereof.

In an implementation of the present subject matter, the module(s) 408 may be machine-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

The module(s) 408 include one or more modules, which may perform different functionalities. The one or more modules include, but are not restricted to, the payment authentication module 112, a verification module 414, and a message-handling module 416. The functions of the payment authentication module 112, the verification module 414, and the message-handling module 416 are explained in later paragraphs. The system 102 can also include other module(s) 418, which supplement additional applications of the system 102.

The data 410 serves, amongst other things, as a repository for storing data that may be fetched, processed, received, or generated by one or more of the module(s) 408. The data 410 may include payment information data 420, message handling data 422, and other data 424 for storing any other data to be utilized by the different modules specified for the system 102. The payment information data 420 and the message handling data 422 will be explained in later paragraphs.

The following description describes the functionality of the system 102 for authenticating electronic payments, in accordance with an implementation of the present subject matter. The payment authentication module 112 detects initiation the electronic payment in the system 102. The payment authentication module 112 can detect initiation of the electronic payment from the merchant application. To detect the initiation of the electronic payment from the merchant application, the payment authentication module 112 can be integrated to the merchant application.

In an implementation, the electronic payment can be initiated based on a rule that specifies a situation for initiating the electronic payment. The situation can include, but is not restricted to, beginning of a month and receipt of a telephone bill. The rule can also include at least one condition for the electronic payment. The at least one condition can include, but is not restricted to, an amount to be paid, a day on which the amount is to be paid, a time of a day at which the amount is to be paid, a frequency of the electronic payment, a recipient of the electronic payment, and a mode of authentication. The day on which the amount is to be paid can be, for example, a day of a week or a day of a month. The frequency of the at least one pending electronic payment can be, for example, hourly, daily, weekly, and the like. A mode of payment may be, for example, an Internet banking mode, a credit card mode, and a debit card mode. The rule can be defined and edited by the user. Further, the user can also create new rules at any time.

Once the electronic payment is initiated, a payment page is communicated to the system 102 by the financial institution. The payment page is received as a web page in the merchant application, from which the electronic payment is initiated. To receive the payment page in the merchant application, the payment authentication module 112 can utilize functionalities, such as WebView™, provided by most mobile operating systems, such as Android™, that enable viewing of web pages on mobile applications. Since the payment authentication module 112 utilizes functionalities provided by most mobile operating systems, the methods and systems of the present subject matter can be used with ease with these mobile operating systems. Further, use of these functionalities, which are of small size, in the payment authentication module 112 enables the payment authentication module 112 to be small in size. Thus, integration of the payment authentication module 112 with the merchant application does not result in a marked increase in the size of the merchant application. Therefore, the systems and methods of the present subject can be used with any merchant application without any significant increase in its size.

As explained earlier, the payment page includes at least one element, each of which corresponds to a mode of authentication. The payment page can also include other elements, which include, but are not restricted to, one or more fields, in which user account details, such as user ID, grid numbers in the payment card, and card verification value (CVV) number, are to be entered.

The payment authentication module 112 identifies the presence of the first element, which corresponds to the first credential, on the payment page. In an example, the first element includes a radio button and text adjacent to the radio button that reads, "I want to generate OTP and authenticate". In an implementation, the identification is performed by scanning for the first element in the payment page. The scanning can be performed, for example, by reading source code, such as Hypertext Markup Language (HTML) code of the payment page. The scanning can be performed also by reading a trigger, such as a header or an identification number, embedded in the payment page. In another implementation, the identification can be performed by receiving information about the presence of the first element in the payment page from the financial institution that communicates the payment page. Similar to identification of the presence of the first element, the payment authentication module 112 can also identify presence of other elements. For example, the payment authentication module 112 can identify presence of a second element that corresponds to the second mode of authentication. The second element may include a radio button and text adjacent to the radio button that reads, "I want to use 3D secure PIN for authentication".

Upon identification of the presence of elements, the payment authentication module 112 receives a selection of the first mode of authentication. In an implementation, to receive the selection of the first mode of authentication, the payment authentication module 112 generates a first interface. If the first element is present in the payment page, the first interface includes the first item for selection of the first mode of authentication. Further, the first interface can include items corresponding to other elements in the payment page. For example, if the second element is present in the payment page, the first interface includes the second item corresponding to the second mode of authentication. The second item may be, for example, a menu with text "Use 3D secure PIN". The payment authentication module 112 generates the first interface in such a way that the first interface is optimized to the size of the display 412. The interface being optimized to the size of the display of refers to providing the items in a way that is easy to be viewed in the display 412. For example, if the system 102 has a small sized display, the items are displayed prominently on the first interface, so that the user would not have to zoom-in or zoom-out the interface to view the items. Examples of the systems having a small sized display include, but are not restricted to, a mobile phone, a smartphone, tablet, and a PDA.

In an implementation, to generate the optimized interface for the display 412, the payment authentication module 112 determines the size of the display 412. The determination of the size of the display 412 can be performed by interacting with application programming interfaces (APIs) of the operating system of the system 102. The determination can be performed also by utilizing Javascript™ queries that return the size of the display. In addition to the size of the display 412, the payment authentication module 112 can also determine the pixel density of the display 412. The pixel density can be determined using appropriate Javascript™ queries. Based on the display size and the pixel density, the payment authentication module 112 then generates the optimized interface.

Since the interface is shown with items corresponding to the elements from the payment page, the payment page is not displayed on the display 412. Thus, at least one component of the payment page, which is not necessary for the electronic payment, may be disabled from loading on the payment page. The at least one component may include, but is not restricted to, logo of the financial institution, logo of a payment gateway, other images, style sheets, and favicons. Thus, the bandwidth consumed in loading the at least one component is conserved. In an example, bandwidth consumed in loading the payment page is reduced by 70%. Therefore, using the methods and systems of the present subject matter, bandwidth consumed in performing electronic payments is considerably reduced. This is particularly useful when the system 102 is a smartphone or a tablet, which uses slow mobile data networks for Internet connection. To disable loading of the at least one component, in an implementation, the payment authentication module 112 utilizes functionalities, such as the WebView™, through which instructions can be provided to disable loading of the at least one component. Further, since the payment page is not displayed, a more or less standard interface can be shown irrespective of different payment pages, which are from different financial institutions. Thus, a viewing experience of the user is significantly improved, as the user now views a uniform interface irrespective of the payment page being loaded in the background.

In an implementation, once the first item is displayed on the display 412, the payment authentication module 112 receives a selection of the first item from the user. In other words, the payment authentication module 112 receives an instruction from the user that the user would like to use the first mode of authentication for the electronic payment.

Instead of receiving the selection of the first mode of authentication on the first item on the first interface, in an implementation, the payment authentication module 112 receives the selection directly based on a stored preference of the user. The preference of the user can be stored in the data 410, from which the payment authentication module 112 can retrieve it. The user preference indicates that the user would like to use the first mode of authentication for authenticating the electronic payment. The data 410 can have user preferences stored for different merchant applications. Correspondingly, the payment authentication module 112 retrieves the user preference based on the merchant application from which the electronic payment is initiated. The storage of the user preference eliminates the need to display the first interface and to receive the selection of the first item, and therefore decreases the time involved in the completion of the electronic payment.

Upon selection of the first mode of authentication, either through the first interface or through the stored user preference, the payment authentication module 112 communicates the user's instruction to the payment page, which then results in the communication of the first credential to the user. As explained earlier, the first credential can be communicated to the user through, for example, an SMS text message, an email, or a message generated by an application of the financial institution in the computing device. If the computing device associated with the user is same as the system 102, the first credential is received in the system 102. Even if the computing device associated with the user is not same as the system 102, the first credential may be forwarded from the computing device associated with the user to the system 102.

In an implementation, the message-handling module 416 can scan incoming messages in the system 102 for the first credential. The incoming messages can include, but are not restricted to, an SMS text message, an email, and a message generated by an application of the financial institution in the computing device. The scanning of incoming messages can be started once the initiation of the electronic payment is detected or when the user's selection of the first item is received.

In an implementation, the scanning includes identifying a message including the first credential. For this, the message-handling module 416 can analyze sender information associated with the incoming messages to determine whether a sender is the financial institution. When the sender of an incoming message is the financial institution, the message-handling module 416 can check body of the incoming message for the first credential. In one example, the checking is performed using a pattern matching technique; in which checking is performed for a specified pattern that resembles the first credential. The pattern matching technique may be a regex pattern matching technique. The message-handling module 416 can also check body of incoming messages from senders other than the financial institution for the first credential. This can be performed if the system 102 does not receive any message from the financial institution. When the message including the first credential is the message generated by the application of the financial institution in the system 102, the scanning includes scanning the message generated in that application. For this, in an implementation, the message-scanning module 414 can interact with the application of the financial institution to gain access to the message. In another implementation, if the application of the financial institution displays the message including the first credential, the message-scanning module 414 can scan the display to identify the first credential.

When the first credential is identified, the message-handling module 416 extracts it from the message. The extracted first credential can be entered into the second interface by the payment authentication module 112. As explained earlier, the second interface is also optimized to the display 412, and is displayed in response to the selection of the first item. In an implementation, the second interface can be same as the first interface. The payment authentication module 112 can also provide an option, in the second interface, to manually enter the first credential. By analyzing incoming messages for the first credential and entering the first credential into the second interface, the system 102 reduces the manual intervention involved in authentication of the electronic payment. Further, the system also eliminates cumbersome tasks of navigating between windows to identify the first credential and memorizing or copy pasting the first credential. In an implementation, the extracted first credential is stored in the message handling data 422 by the message-handling module 416.

In an implementation, the payment authentication module 112 can display one or more input fields on the second interface for entering different credentials. For example, if the user selects the second item on the first interface, the payment authentication module 112 shows an input field in the second interface in which the second credential can be entered. Similarly, the payment authentication module 112 can also show other input fields in the second interface, in which the user account details can be entered.

After entering the first credential in the second interface, the payment authentication module 112 can communicate the first credential to the payment page, for authentication of the electronic payment. The payment authentication module 112 can communicate the first credential after it receives a selection from the user, in the interface, to communicate the first credential. Similar to communicating the first credential, the payment authentication module 112 can communicate details in other input fields in the second interface. The details in the other input fields can be communicated after receiving the selection from the user.

In an implementation, before entering the first credential, the second credential, or the user account details into the second interface, the verification module 414 can verify whether an identity associated with the system 102 is same as an identity of the user registered with the financial institution. For example, the verification module 414 verifies whether a phone number of the system 102 is same as a phone number of the user registered with the financial institution. The verification module 414 can verify other identities of the system 102 also, such as International Mobile Equipment Identity (IMEI) number, a Media Access Control (MAC) ID, any other unique ID provided by manufacturer of the system 102, and any unique ID provided by manufacturer of operating system of the system 102.

Similar to the payment authentication module 112, the verification module 414 and the message-handling module 416 also can be integrated to the merchant application. Together, the three modules act as a payment authentication library.

In an implementation, the payment authentication module 112 receives at least some credentials from the payment information data 420. For example, the payment authentication module 112 can receive the user ID and the password from the payment information data 420. The payment authentication module 112 can automatically enter the credentials to corresponding items in the second interface. The filled items can be edited by the user.

Figure 5A:
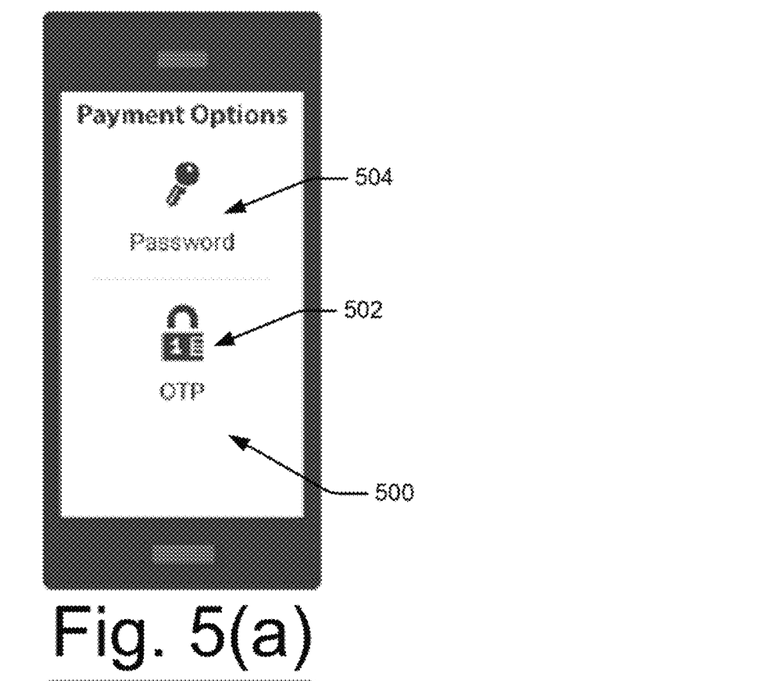
FIG. 5(a) illustrates a first interface, in accordance with an implementation of the present subject matter.

FIG. 5(a) illustrates a first interface 500, in accordance with an implementation of the present subject matter. As shown in FIG. 5(a), the first interface 500 includes a first item 502 and a second item 504. The first item 502 corresponds to a first element on the payment page (not shown in Fig), which, in turn, corresponds to a first credential, commonly known as OTP. The second item 504 corresponds to a second element on the payment page, which, in turn, corresponds to a second credential. In an implementation, the second credential is a password.

Figure 5B:
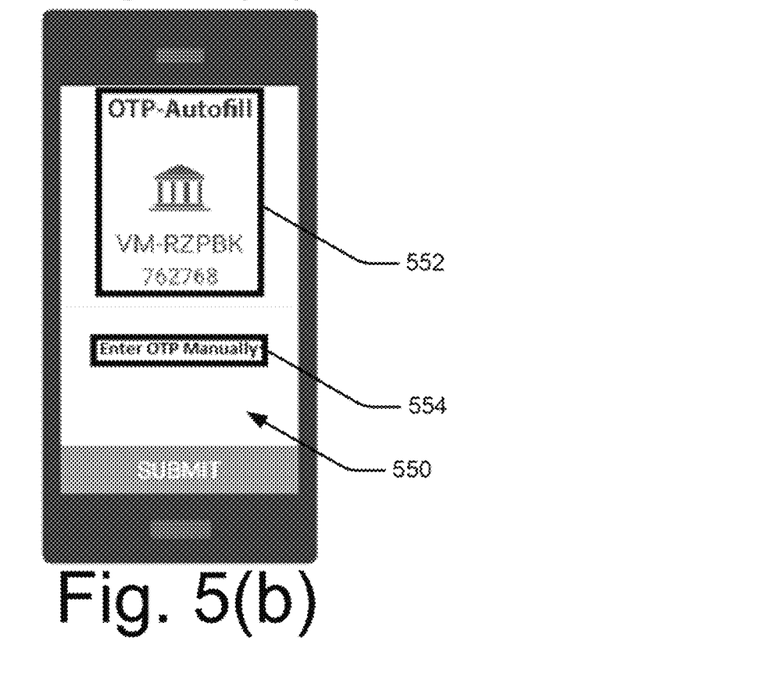
FIG. 5(b) illustrates a second interface, in accordance with an implementation of the present subject matter.

FIG. 5(b) illustrates a second interface 550, in accordance with an implementation of the present subject matter. The second interface 550 includes a field 552 with the extracted first credential and an option 554 to enter the first credential manually. The field 552 and the option 554 are displayed on the second interface 550 in response to the user selection of the first item 502.

Figure 6:
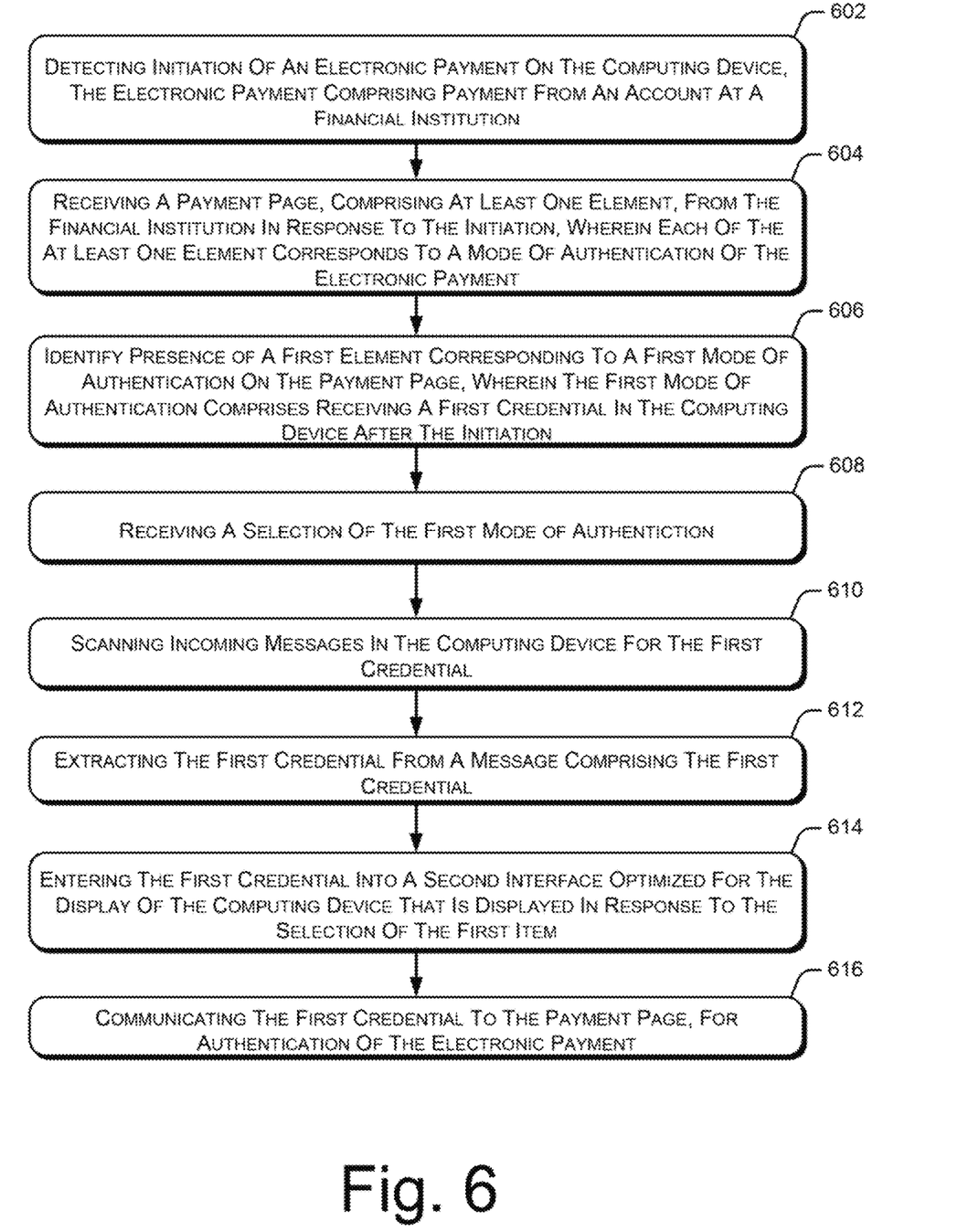
FIG. 6 illustrates a method for authenticating an electronic payment, in accordance with an implementation of the present subject matter.

FIG. 6 illustrates a method 600 for providing authentication of an electronic payment, in accordance with an implementation of the present subject matter.

It may be understood that steps of the method 600 may be performed by programmed computing systems. The steps of the methods 600 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

The order in which the method 600 is described is not intended to be construed as a limitation, and any number of the described method blocks can be combined in any order to implement the method 600, or an alternative method. Additionally, individual blocks may be deleted from the method 600 without departing from the scope of the subject matter described herein. Furthermore, the method 600 can be implemented in any suitable hardware, non-transitory machine-readable instructions, or combination thereof.

Steps of the method 600 can be performed by programmed computing devices. Herein, some examples are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media, such as a magnetic disks and magnetic tapes, hard drives, or optically readable digital data storage media. The examples are also intended to cover both communication network and communication system to perform said steps of the example method.

Further, although the method 600 for authenticating the electronic payment may be implemented in a variety of computing systems working in different network environments, in examples described in FIG. 6, the method 600 is explained in context of the aforementioned system 102 implemented in the example network environment 100 for ease of understanding.

At step 602, initiation of an electronic payment on a computing device is detected. The electronic payment includes payment from an account at a financial institution. The detection can be performed by the payment authentication module 112.

At step 604, a payment page including at least one element is received from the financial institution in response to the initiation. Each of the at least one element corresponds to a mode of authentication of the electronic payment.

At step 606, the presence of a first element corresponding to a first mode of authentication on the payment page is identified. The first mode of authentication involves receiving a first credential in the computing device after the initiation. The scanning can be performed by the payment authentication module 112. In an implementation, the identification is performed in the third server 108.

At step 608, a selection of the first mode of authentication is received. As explained earlier, the selection can be received on first item of a first interface optimized for a display of the computing device or from a stored user preference. The receiving can be performed by the payment authentication module 112.

At step 610, incoming messages in the computing device are scanned for the first credential. The scanning can be performed by the message-handling module 416.

At step 612, the first credential is extracted from the message comprising the first credential. The extraction can be performed by the message-handling module 416.

At step 614, the first credential is entered into a second interface that is displayed in response to the selection at step 610. This can be performed by the payment authentication module 112.

At step 616, the first credential is communicated to the payment page for authentication of the electronic payment. This can be performed by the payment authentication module 112.

Figure 7:
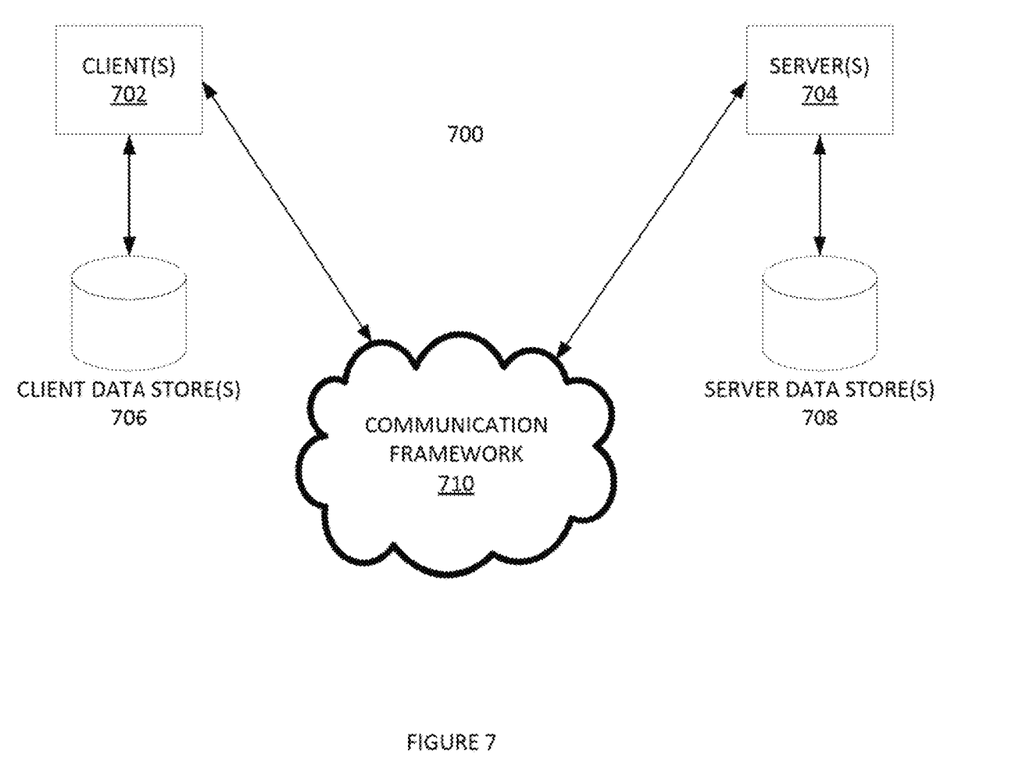
FIG. 7 is a block diagram of a sample computing environment that can be utilized to implement some embodiments.

FIG. 7 is a block diagram of a sample computing environment 700 that can be utilized to implement some embodiments. The system 700 further illustrates a system that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). One possible communication between a client 702 and a server 704 may be in the form of a data packet adapted to be transmitted between two or more computer processes. The system 700 includes a communication framework 710 that can be employed to facilitate communications between the client(s) 702 and the server(s) 704. The client(s) 702 are connected to one or more client data store(s) 706 that can be employed to store information local to the client(s) 702. Similarly, the server(s) 704 are connected to one or more server data store(s) 708 that can be employed to store information local to the server(s) 704.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized-method for authentication of an electronic payment on a computing device, the method comprising:

detecting, by a processor, initiation of an electronic payment on the computing device, the electronic payment comprising payment from an account at a financial institution;

receiving, by the processor, a payment page, comprising at least one element, from the financial institution in response to the initiation, wherein each of the at least one element corresponds to a mode of authentication of the electronic payment;

identifying, by the processor, presence of a first element corresponding to a first mode of authentication on the payment page, wherein the first mode of authentication comprises receiving a first credential in the computing device after the initiation, wherein the first element comprises a graphical control element;

receiving, by the processor, a selection of the first mode of authentication;

scanning, by the processor, incoming messages communicated via a communication network in the computing device for the first credential, wherein the scanning is performed by reading a trigger comprising a header or an identification number embedded in the payment page;

extracting, by the processor, the first credential from a message comprising the first credential;

entering, by the processor, the first credential into a second interface optimized for a size of the display of the computing device that is displayed in response to the selection of the first element;

communicating, by the processor, the first credential to the payment page, for authentication of the electronic payment;

generating, by the processor, a first interface optimized for the display of the computing device, the first interface comprising a first element for selection of the first mode of authentication;

wherein generating at least one of the first interface and the second interface optimized for display comprises:
determining a size of the display of the computing device,
determining a pixel density of the display, and
optimizing a size of the first interface and the second interface for display on the computing device based on the size of the display and the pixel density of the display; and receiving, by the processor, a selection of the first element on the first interface.

2. The method as claimed in claim 1, wherein the method comprises:
identifying presence of a second element corresponding to a second mode of authentication on the payment page, wherein the second mode of authentication comprises using a second credential provided before initiation of the electronic payment; and
displaying a second item corresponding to the second element on the first interface.

3. The method as claimed in claim 1, wherein the identifying the presence of the first element is performed in a third server mediating communication between a first server and the computing device.

4. The method as claimed in claim 1, wherein the method comprises disabling loading of at least one component of the payment page.

5. The method as claimed in claim 1, wherein the method comprises initiating the electronic payment based on a rule, wherein the rule specifies at least one situation for initiating the electronic payment.

6. The method as claimed in claim 5, wherein the rule comprises at least one condition for the electronic payment, and wherein the at least one condition comprises at least one of an amount to be paid, a day on which the amount is to be paid, a time of a day at which the amount is to be paid, a frequency of the electronic payment, and a recipient of the electronic payment.

7. The method as claimed in claim 1, comprising, before entering the credential into the second interface, verifying whether an identity associated with the computing device is same as an identity of a user performing the electronic payment.

8. A computerized system for authenticating an electronic payment, the system comprising:
a processor;
a display;
a payment authentication library coupled to the processor to:
identify presence of a first element on a payment page received in response to initiation of an electronic payment, the payment page comprising at least one element, wherein each of the at least one element corresponds to a mode of authentication for the electronic payment and wherein the first element corresponds to a first mode of authentication that comprises receiving a first credential in the system after the initiation, wherein the first element comprises a graphical control element;
receive a selection of the first mode of authentication;
scan incoming messages communicated via a communication network in the system for the first credential, wherein the payment authentication library is to scan the incoming messages on one of initiation of the electronic payment and selection of the first element on the first interface, wherein the scanning is performed by reading a Hypertext Markup Language (HTML) source code of the payment page;
extract the first credential from a message comprising the first credential;
enter the first credential into a second interface that is displayed in response to the selection of the first element, the second interface optimized for the size of the display;
communicate the first credential to the payment page, for authentication of the electronic payment;
generate, by the processor, a first interface optimized for the display of the computing device, the first interface comprising a first element for selection of the first mode of authentication;
wherein the step of generate at least one of the first interface and the second interface optimized for display comprises:
determine a size of the display of the computing device,
determine a pixel density of the display, and
optimize a size of the first interface and the second interface for display on the computing device based on the size of the display and the pixel density of the display; and
receive, by the processor, a selection of the first element on the first interface.

9. The computerized system as claimed in claim 8, wherein the payment authentication library is to be integrated with a merchant application from which the electronic payment is initiated.

10. The computerized system as claimed in claim 8, wherein the payment authentication library is to disable loading of at least one component on the payment page.

11. The computerized system as claimed in claim 8, wherein, to scan the incoming messages, the payment authentication library is to interact with an application of the financial institution on the system.

12. The computerized system as claimed in claim 8, wherein the system is a device with a small sized display.

13. The computerized system as claimed in claim 8, wherein, to receive the selection of the first mode of authentication, the payment authentication library is to:
generate a first interface optimized for the display, the first interface comprising
the first element for selection of the first mode of authentication; and
receive selection of the first element.

14. The computerized system as claimed in claim 13, wherein the payment authentication library is to:
identify presence of a second element corresponding to a second mode of authentication on the payment page, wherein the second mode of authentication comprises authenticating using a second credential that is provided before initiation of the electronic payment;
display a second item on the first interface for selection of the second mode of authentication; and
display an input field for entry of the second credential on the second interface.

15. The computerized system as claimed in claim 8, wherein the payment authentication library is to initiate the electronic payment based on a rule, wherein the rule specifies at least one situation for initiating the electronic payment and comprises at least one condition for the electronic payment, wherein the first graphical control element comprises a radio button.

16. A computerized system for authentication of an electronic payment on a computing device, the system comprising:
(a) a computer memory in the computing device a payment page, comprising at least one element, from the financial institution in response to the initiation,
wherein each of the at least one element corresponds to a mode of authentication of an electronic payment, and wherein the payment page is received by the computing device from a remote server;
(b) a computer processor in the computing device, which computer processor is coupled to the computer store and programmed to:
(i) detect an initiation of the electronic payment on the computing device, the electronic payment comprising payment from an account at a financial institution;
(ii) obtain the payment page from the computer memory;
(iii) identify a presence of a first element corresponding to a first mode of authentication on the payment page, wherein the first mode of authentication comprises receiving a first credential in the computing device after the initiation;
(iv) receive a selection of the first mode of authentication;
(v) scan a set of incoming messages communicated via communication network in the computing device for the first credential, wherein the incoming messages are scanned by reading a trigger comprising a header or an identification number embedded in the payment page or by reading Hypertext Markup Language (HTML) source code of the payment page;
(vi) extract the first credential from a message comprising the first credential;
(vii) enter the first credential into a second interface optimized for a display of the computing device that is displayed in response to the selection of the first element; and
(viii) communicate the first credential to the payment page, for authentication of the electronic payment,
wherein the computer processor is programmed to receive the selection of the first mode of authentication comprising the steps of:
generating by the processor, a first interface optimized for the display of the computing device, the first interface comprising a first element for selection of the first mode of authentication,
receiving, by the processor, a selection of the first element on the first interface, and
wherein the computer processor is programmed to generate at least one of the first interface and the second interface comprising the steps of:
determining size of the display, and
determining pixel density of the display.

* * * * *